United States Patent
Harada

(10) Patent No.: US 10,150,563 B2
(45) Date of Patent: Dec. 11, 2018

(54) AUTONOMOUS MOVING MACHINE SYSTEM

(71) Applicant: Panasonic Intellectual Property Corporation of America, Torrance, CA (US)

(72) Inventor: Naoyuki Harada, Osaka (JP)

(73) Assignee: PANASONIC INTELLECTUAL PROPERTY CORPORATION, Torrance, CA (US)

(*) Notice: Subject to any disclaimer, the term of this patent is extended or adjusted under 35 U.S.C. 154(b) by 38 days.

(21) Appl. No.: 15/458,921

(22) Filed: Mar. 14, 2017

(65) Prior Publication Data

US 2017/0285640 A1 Oct. 5, 2017

(30) Foreign Application Priority Data

Apr. 1, 2016 (JP) .............................. 2016-074458
Nov. 18, 2016 (JP) .............................. 2016-225453

(51) Int. Cl.
*B64C 39/02* (2006.01)
*G05B 19/048* (2006.01)
(Continued)

(52) U.S. Cl.
CPC ............ *B64C 39/024* (2013.01); *G01S 19/24* (2013.01); *G05B 19/048* (2013.01); *G05D 1/104* (2013.01);
(Continued)

(58) Field of Classification Search
CPC .......... G01C 21/00; G01C 21/34; G05D 1/00; G05D 1/10; H04W 16/18; H04W 28/02
(Continued)

(56) References Cited

U.S. PATENT DOCUMENTS

2015/0051758 A1* 2/2015 Cho .................... G05D 1/0676
701/16
2015/0057871 A1 2/2015 Ono et al.
(Continued)

FOREIGN PATENT DOCUMENTS

JP 2006-300700 11/2006
JP 2014-149622 8/2014

OTHER PUBLICATIONS

The Extended European Search Report dated Aug. 9, 2017 for the related European Patent Application No. 17162463.8.

*Primary Examiner* — Thomas G Black
*Assistant Examiner* — Wae L Louie
(74) *Attorney, Agent, or Firm* — Greenblum & Bernstein, P.L.C.

(57) ABSTRACT

An autonomous moving machine system continuously maintaining moving machines thereof at higher reliability is provided. Each moving machine measures a self-location thereof with a sensor thereof, and autonomously moves to a target location by controlling a mover. Operations of the moving machine includes acquiring sensor information, estimating the self-location in accordance with the sensor information, calculating the reliability of the self-location, transmitting the reliability to the other moving machine. Operations of a particular moving machine further includes recording history information that associates the reliability, the self-location, and an identifier identifying each of the moving machines, selecting a moving machine to restore the reliability in accordance with the history information and moving the selected moving machine to a location where the reliability of the selected moving machine increases.

16 Claims, 8 Drawing Sheets

(51) Int. Cl.
*G01S 19/24* (2010.01)
*G05D 1/10* (2006.01)

(52) U.S. Cl.
CPC .. *B64C 2201/108* (2013.01); *B64C 2201/127* (2013.01); *B64C 2201/141* (2013.01); *B64C 2201/145* (2013.01); *G05B 2219/25062* (2013.01)

(58) Field of Classification Search
USPC .................................................. 701/3, 16, 26
See application file for complete search history.

(56) References Cited

U.S. PATENT DOCUMENTS

| | | | |
|---|---|---|---|
| 2015/0120126 A1* | 4/2015 | So | G01C 23/00 701/26 |
| 2016/0117932 A1* | 4/2016 | Park | G01S 19/39 701/3 |
| 2017/0069214 A1* | 3/2017 | Dupray | G08G 5/0021 |
| 2017/0094530 A1* | 3/2017 | Ross | B64C 39/024 |
| 2017/0285640 A1* | 10/2017 | Harada | G05B 19/048 |
| 2017/0285661 A1* | 10/2017 | Harada | B64C 39/024 |
| 2017/0344939 A1* | 11/2017 | Linton | G01S 5/0294 |
| 2018/0074520 A1* | 3/2018 | Liu | G05D 1/104 |
| 2018/0091939 A1* | 3/2018 | Venkatraman | H04W 4/021 |
| 2018/0112983 A1* | 4/2018 | Ahmed | G01C 21/005 |
| 2018/0124631 A1* | 5/2018 | Ramos de Azevedo | H04W 28/0226 |
| 2018/0143313 A1* | 5/2018 | Wetzler | G01S 5/163 |
| 2018/0157255 A1* | 6/2018 | Halverson | B64C 39/024 |

\* cited by examiner

FIG. 3 id = 1001

| TIME | COORDINATES | RELIABILITY |
|---|---|---|
| 0 | A | 0.9 |
| 1 | B | 0.7 |
| 2 | C | 1.0 |
| 3 | D | 0.8 |
| 4 | E | 0.6 |
| 5 | F | 0.5 |
| 6 | G | 0.3 | id = 1002

| TIME | COORDINATES | RELIABILITY |
|---|---|---|
| 0 | H | 0.8 |
| 1 | I | 0.9 |
| 2 | J | 1.0 |
| 3 | K | 0.8 |
| 4 | L | 0.7 |
| 5 | M | 0.6 |
| 6 | N | 0.5 |

⋮

AUTONOMOUS MOVING MACHINE SYSTEM

BACKGROUND

1. Technical Field

The present disclosure relates to an autonomous moving machine system that includes multiple moving machines, each moving machine autonomously moving to a target location by measuring a self-location with a sensor thereof and by controlling a mover.

2. Description of the Related Art

Moving machines are disclosed that autonomously and individually move to a target location while detecting a self-location thereof using a variety of sensors. Such a moving machine is unable to reach a predetermined location and then to accomplish a target job there if the moving machine fails to acquire the self-location.

Japanese Unexamined Patent Application Publication No. 2014-149622 discloses an autonomous flying robot that independently and autonomously moves while acquiring a self-location in accordance with memorized map information including information concerning obstacles, such as buildings, and measurement results of a sensor. If a relatively large obstacle, such as a truck, appears, an ambient environment may greatly change, possibly causing the autonomous flying robot to be unable to acquire the self-location. In such a case, the autonomous flying robot re-acquires the self-location by increasing a flying height and then performs a target job.

Japanese Unexamined Patent Application Publication No. 2006-300700 discloses another technique. According to the disclosure, multiple moving machines receive information related to self-locations through communication. The moving machines are divided by role. A first type of moving machine is able to acquire the absolutely accurate self-location thereof using satellites. A second type of moving machine acquires the self-location thereof, based on a relative positional relationship with the first type of moving machine. The second type of moving machine that is unable to directly acquire an absolute self-location is able to perform a job, based on the absolute self-location.

The re-acquisition technique disclosed in Japanese Unexamined Patent Application Publication No. 2014-149622 is not applicable to a moving machine that runs on the ground. If there is a bridge or a power-transmission line in the air, it may be difficult to fly the moving machine high above.

In accordance with the technique disclosed in Japanese Unexamined Patent Application Publication No. 2006-300700, if multiple moving machines are present in a wide area, multiple moving machines designed to acquire absolute self-locations may be needed. When an infrastructure inspection job is performed, the use of the moving machines that include a dedicated moving machine that is designed to acquire an absolute self-position leads to an inefficient job. Increasing the efficiency of the job using all moving machines is considered to be difficult.

Even if these techniques are combined, it is still difficult to operate the multiple moving machines in an efficient way.

SUMMARY

One non-limiting and exemplary embodiment provides an autonomous moving machine system that efficiently operates multiple moving machines.

In one general aspect, the techniques disclosed here feature an autonomous moving machine system. The autonomous moving machine system includes multiple moving machines. Each moving machine autonomously moves to a target location by measuring a self-location thereof with a sensor and by controlling a mover. The moving machine includes a sensor information acquisition unit that acquires sensor information related to the self-location and including a relative positional relationship between the sensor and another moving machine, a position estimating unit that estimates the self-location in accordance with the sensor information acquired by the sensor information acquisition unit, a reliability calculating unit that calculates the reliability of the self-location estimated by the position estimating unit, a moving machine information communication unit that exchanges retention information stored thereon with other moving machines, a position reliability recording unit that records in an associated form the reliability calculated by the reliability calculating unit, the self-location estimated by the position estimating unit, and an identifier identifying each moving machine, a reliability restoring moving machine selecting unit that selects, based on information stored on the position reliability recording unit, the moving machine that takes a reliability restoring action, and a reliability restoring action control unit that controls the mover such that the moving machine selected by the reliability restoring moving machine selecting unit moves to a location having higher reliability.

According to the disclosure, a moving machine that moves to a location where a self-location is acquired at higher reliability is selected from a group of multiple moving machines, and selection results are shared among the moving machines. The group of moving machines may thus autonomously move while stably acquiring the self-locations at high reliability. In this way, the moving machines are efficiently operated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 visually illustrates an example of data stored on a memory;

DETAILED DESCRIPTION

Autonomous moving machine systems of embodiments of the disclosure is described with reference to the drawings.

The embodiments described below are examples of the moving machine of the disclosure. The embodiments are described for reference purposes, and the scope of the disclosure is not limited by the embodiments but is limited by the claims. Elements in the embodiment not described in an independent claim that indicates a generic concept are not necessarily needed to achieve the object of the disclosure but are used to form a more preferable configuration.

The drawings are highlighted, partially omitted, and diagrammatically adjusted in size ratio to indicate the disclosure, and may be different from real shapes, positional relationship, and size ratio.

First Embodiment

A first embodiment of the disclosure is described below. The first embodiment is related to an autonomous flying object, so-called drone, as a moving machine 100 in an autonomous moving machine system 110.

Figure 1:
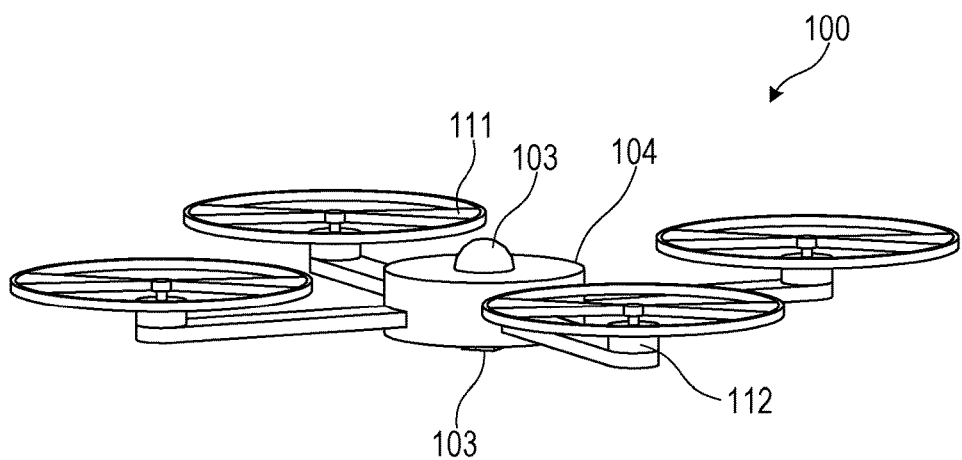
FIG. 1 is a perspective view of a moving machine in an autonomous moving machine system of a first embodiment.

FIG. 1 is a perspective view of the moving machine 100 in the autonomous moving machine system 110 of the first embodiment.

Figure 2:
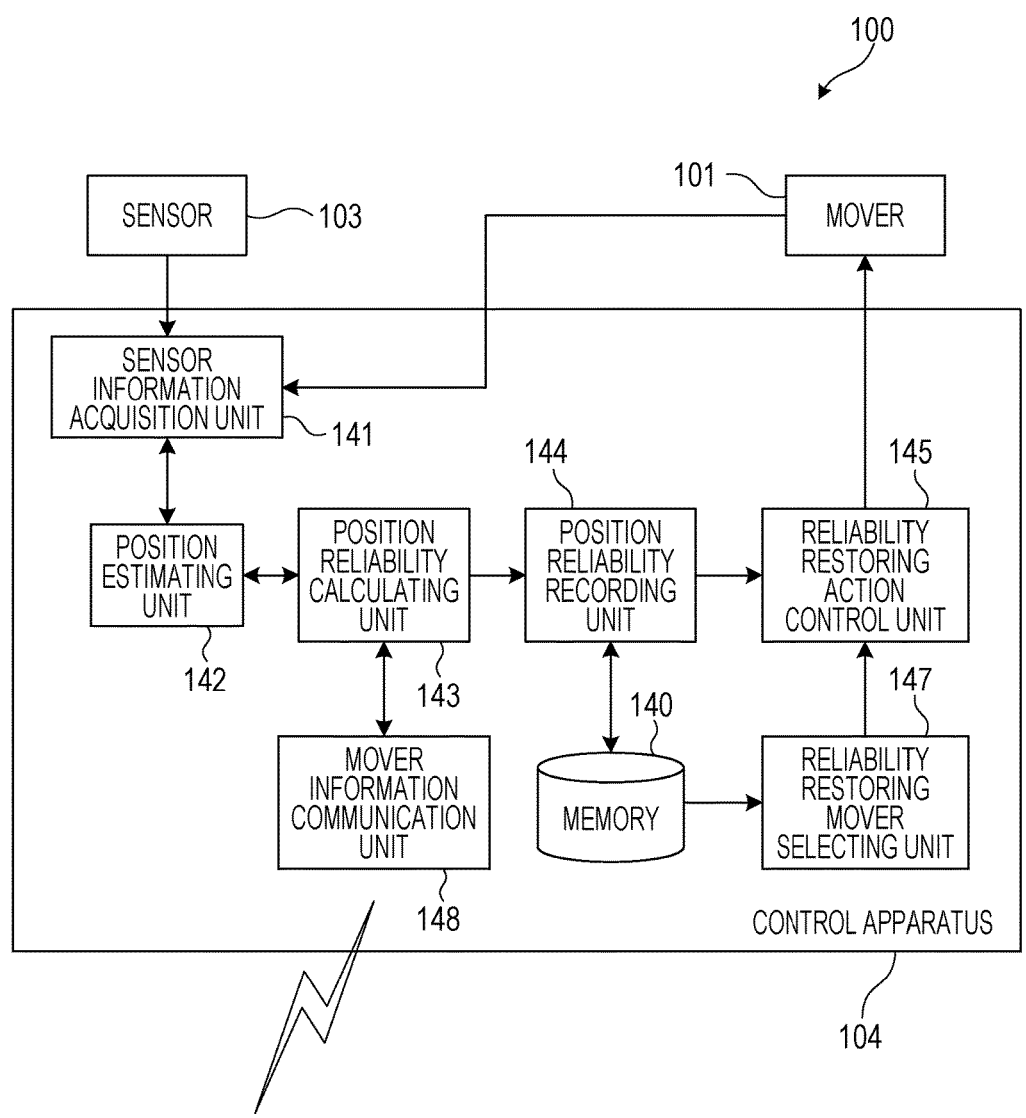
FIG. 2 is a block diagram illustrating part of functional units of each moving machine in the autonomous moving machine system of the first embodiment together with part of mechanical units of the moving machine.

FIG. 2 is a block diagram illustrating part of functional units of each moving machine 100 in the autonomous moving machine system 110 of the first embodiment together with part of mechanical units of the moving machine.

Referring to FIG. 1 and FIG. 2, the moving machine 100 includes multiple rotors (propellers) 111 as the mover 101, multiple motors 112 that respectively drive the rotors 111, a sensor 103 that acquires the self-location thereof, and a control apparatus 104 that acquires a signal from the sensor 103 and controls autonomous movement by controlling the motors 112.

The drone-type moving machine 100 including the multiple rotors 111 individually control the rotational speeds of the rotors 111, thereby moving the moving machine 100 in a variety of directions (left and right, up and down, back and forth), and adjusting the posture thereof. In accordance with the first embodiment, the control apparatus 104 also acquires from the mover 101, as sensor information, information concerning a control state of the rotational speed of the rotor 111, and uses the sensor information as part of information that is used to estimate the self-location of the moving machine 100.

Any particular device is acceptable as the sensor 103 as long as the device acquires information that estimates the self-location through measurement. More specifically, the sensor 103 may be an inertia measurement unit (IMU) that detects angles and speed thereof in three axial directions, and acceleration in the three axial directions, a pressure meter (altimeter), a flowmeter (anemometer), a global positioning system (GPS) receiver, a laser range finder (LRF), or a depth camera. The sensor 103 may also include a device that acquires, as the sensor information, information related to a relative positional relationship between the self-location and the location of another moving machine 100. For example, the LRF may be used to acquire, as the sensor information, relative position information that indicates a relative positional relationship of the moving machine 100 with another moving machine 100 present in the ambient space.

The moving machine 100 may include one or more of several types of sensors 103. The sensor 103 that is to be mounted is selected depending on the type, purpose of movement, and target location of the moving machine 100.

The control apparatus 104 moves the host moving machine 100 by controlling the mover 101 in response to the information acquired from the sensor 103 or another moving machine 100 as illustrated in FIG. 2. In other words, the control apparatus 104 is a computer including a central processing unit (CPU) and performs a variety of processes by executing a program stored on a memory 140. The control apparatus 104 includes, as processing units that are executed by executing the program, a sensor information acquisition unit 141, a position estimating unit 142, a position reliability calculating unit 143, a position reliability recording unit 144, a reliability restoring action control unit 145, a reliability restoring moving machine selecting unit 147, and a moving machine information communication unit 148.

In accordance with the first embodiment, each moving machine 100 includes the control apparatus 104. The moving machine 100 is autonomously moved by the control apparatus 104. The moving machine 100 also moves while recognizing a relative relationship with another moving machine 100.

The memory 140 may be an information storage device, such as a read-only memory (ROM), or a hard disk drive (HDD). The control apparatus 104 stores the self-location and a program corresponding to each process. The memory 140 also stores position information of a target location, and map information indicating a path and an obstacle.

The sensor information acquisition unit 141 is a processor that acquires a signal t measured by the sensor 103 as the sensor information used to estimate the self-location. The sensor information acquisition unit 141 also acquires, as the sensor information, information acquired from the mover 101, for example, control information such as the rotational speed of each of the rotors 111. The sensor information acquisition unit 141 further acquires, as the sensor information, a relative positional relationship with the other moving machines 100.

The position estimating unit 142 is a processor that estimates as the self-location the present position of the moving machine 100, based on at least a piece of sensor information and a relationship between the sensor information and the self-location of another moving machine 100 acquired from the other moving machine 100. In accordance with the first embodiment, the position estimating unit 142 calculates a location as results that the sensor 103 has actually measured, based on multiple pieces of sensor information. The position estimating unit 142 acquires the self-location of the other moving machine 100 from the other moving machine 100, calculates the measurement location from the sensor information indicating the relative position information related to the other moving machine 100, and estimates the self-location by combining the measurement locations.

The method of estimating the self-location is not limited to any particular one. For example, a Kalman filter may be used to estimate the self-location, based on a measurement location that is calculated from a signal received from GPS satellites, and a measurement location calculated from sensor information acquired from an inertial measurement device. Simultaneous localization and mapping (SLAM) may be used to estimate the self-location, based on a measurement location that is calculated by checking sensor information from a depth camera against the map information stored on the memory 140 and a measurement location that is calculated from the sensor information from the inertial measurement device.

If the Kalman filter is used as the position estimating unit 142, the self-location is represented as the normal distribution. The variance of the normal distribution increases in response to elapsed time or an amount of travel from last observation of an absolute position and decreases by observing the absolute position. More specifically, the reliability value increases in response to the elapsed time or the amount of travel from the last observation of the absolute position and decreases by observing the absolute position. The observation of the absolute position may be performed through position fixing using the GPS, or by observing a landmark whose position is known.

The position reliability calculating unit 143 is a processor that calculates the reliability value of the self-location, based on the reliability value of the sensor 103 itself that performs measurement, the reliability value that decreases with time, and an error in the sensor information that is used to estimate the self-location. In accordance with the first embodiment, when the position estimating unit 142 estimates the self-location, based on the measurement location indicating the relative positional relationship with the other moving machine 100 and the self-location of the other moving machine 100, the position reliability calculating unit 143 calculates the reliability value in combination with the reliability value of the other moving machine 100 that is acquired from the other moving machine 100 via the moving machine information communication unit 148.

The calculation method of the reliability value performed by the position reliability calculating unit 143 may include using a distribution (such as the normal distribution) that is used when the position estimating unit 142 estimates the self-location and calculating as the reliability value a reciprocal of the variance of the distribution.

The moving machine information communication unit 148 transmits retention information stored thereon to another moving machine 100 included in the autonomous moving machine system 110.

The retention information includes the self-location, the reliability value of the self-location, the absolute location of the other moving machine 100, the reliability value of the absolute location, the relative positional relationship between the self-location and the other moving machine 100, and the reliability value of the relative positional relationship. The retention information, if retained by the moving machine 100, may be the sensor information acquired by the sensor information acquisition unit 141, or the signal from the sensor 103.

The following items of information may be combined as the retention information the moving machine information communication unit 148 transmits or receives. (1) Self-location and the reliability value thereof, (2) absolute location of the other moving machine 100 and the reliability value thereof, (3) relative position between the self-location and the other moving machine 100, and the reliability value thereof. In accordance with the first embodiment, the moving machine information communication unit 148 transmits and receives signals via radio communication such that the moving machines 100 share with the other moving machine 100 the retention information including the self-locations and the reliability value thereof.

The position reliability recording unit 144 is a processor that records on the memory 140 the self-location (coordinates) estimated by the position estimating unit 142 and the reliability value calculated by the position reliability calculating unit 143 with the self-location and the reliability value in association with each other. In accordance with the first embodiment as illustrated in FIG. 3, the position reliability recording unit 144 stores on the memory 140 time information in association with the self-location and the reliability. Furthermore, time information, the self-location (coordinates), and the reliability value, transmitted from another moving machine 100, are stored in association with an identity (id) on the memory 140. The time information is information indicating time when the position estimating unit 142 estimates the self-location. Referring to FIG. 3, an identification symbol is attached to information related to time and coordinates, other than the reliability, for identification. The identification symbol has no specific meaning, and different identification symbols could represent the same coordinates.

The reliability restoring moving machine selecting unit 147 is a processor that selects a moving machine 100 that is to perform a reliability restoring action in response to information recorded by the position reliability recording unit 144. In accordance with the first embodiment, each moving machine 100 in the autonomous moving machine system 110 includes the reliability restoring moving machine selecting unit 147. If the host moving machine 100 satisfies a predetermined condition, the host moving machine 100 selects itself as a moving machine 100 to restore the liability of the whole autonomous moving machine system 110.

Figure 4:
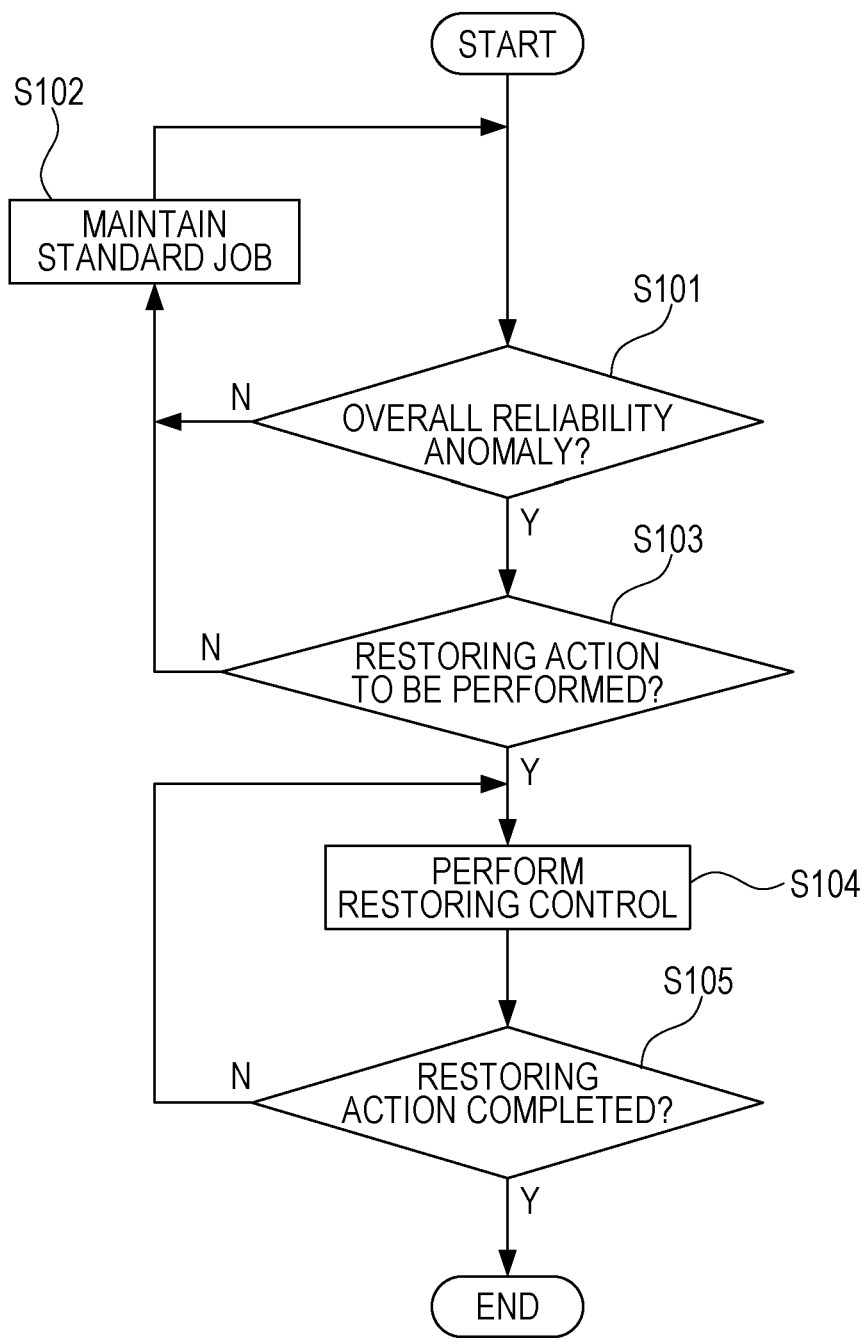
FIG. 4 is a flowchart illustrating a process of a reliability restoring moving machine selecting unit.

FIG. 4 is a flowchart illustrating a process of the reliability restoring moving machine selecting unit 147.

Referring to FIG. 4, the reliability restoring moving machine selecting unit 147 determines whether the reliability value of the whole autonomous moving machine system 110 satisfies a predetermined condition (S101). The evaluation of the overall reliability is performed based on the reliability value of each moving machine 100 stored on the memory 140. If the whole autonomous moving machine system 110 does not satisfy the predetermined condition (no branch from S101), a standard job continues. The standard job includes a job of the moving machine 100 to move to a target location, and a job of performing an inspection operation at the target location.

Examples (patterns) of a specific determination method that is performed when the overall reliability satisfies the predetermined condition are described below.

1.1 The reliability restoring moving machine selecting unit 147 reads from the memory 140 the reliability value of the host moving machine 100 and the reliability value of another moving machine 100, and performs a statistical operation on the read reliability values, and calculates the variance at each time point. If the calculated variance continues to be equal to or above a first threshold value for a first threshold duration of time, the reliability restoring moving machine selecting unit 147 proceeds to an operation (S103) to select a moving machine 100 that is to perform the reliability restoring action.

All the moving machines 100 are determined to be in a state that merely causing the moving machines 100 to mutually observe a positional relationship therebetween and to share observation results through communication is not sufficient to uniformly increase all reliability values.

1.2 The reliability restoring moving machine selecting unit 147 proceeds to an operation (S103) to select a moving machine 100 that is to take a reliability restoring action if a difference between a minimum value and a maximum value of the reliability values of all the moving machines 100 continues to be equal to or above a first threshold value for a first threshold duration of time.

In such a case, the same is true, again. All the moving machines 100 are determined to be in a state that merely causing the moving machines 100 to mutually observe a positional relationship therebetween and to share observation results through communication is not sufficient to uniformly increase all reliability values.

1.3 The reliability restoring moving machine selecting unit 147 statistically processes the reliability values of all moving machines 100. If at least one of the maximum value, mean value, and median thus acquired is lower than a second threshold value, the reliability restoring moving machine selecting unit 147 proceeds to the operation (S103) to select the moving machine 100 that is to take the reliability restoring action.

All the moving machines 100 are determined to be in a state that all reliability values are not uniformly increased even if the moving machines 100 measure relative locations and communicate with each other.

1.4 The reliability restoring moving machine selecting unit 147 statistically processes the reliability values of all moving machines 100, and compares at least one of the resulting maximum value, mean value, and median with the corresponding type of value immediately preceding thereto. If the difference is equal to or above a third threshold value, the reliability restoring moving machine selecting unit 147 determines that all the reliability values sharply drop and then proceeds to the operation (S103) to select a moving machine 100 that is take the reliability restoring action.

In such a case, multiple moving machines 100 are determined to be losing track of the self-locations in response to a disturbance, such as a blast of wind.

The moving machine 100 that is to take the reliability restoring action is selected in accordance with information recorded by the position reliability recording unit 144 (S103).

Listed below are examples (patterns) of selection conditions when the moving machine 100 that is to take the reliability restoring action is selected. In accordance with the first embodiment, each moving machine 100 including the reliability restoring moving machine selecting unit 147 determines whether the selection condition described below is satisfied. If the moving machine 100 determines that the selection condition is satisfied (yes branch from S103), the moving machine 100 autonomously takes a reliability restoring action (S104). If the moving machine 100 determines that the selection condition is not satisfied (no branch from S103), the moving machine 100 continues a standard job.

2.1 The reliability restoring moving machine selecting unit 147 selects the moving machine 100 that is to take the reliability restoring action in response to the reliability value. For example, the reliability restoring moving machine selecting unit 147 selects a moving machine 100 having a lowest reliability value as the moving machine 100 that is to take the reliability restoring action. The selection condition is applicable if the variance of the reliability values of all the moving machines 100 continues to be equal to or above a first threshold value for a first threshold duration of time, or if a difference between a minimum value and a maximum value of the reliability values of all the moving machines 100 continues to be equal to or above the first threshold value for the first threshold duration of time.

In accordance with the first embodiment, the latest reliability values of the other moving machines 100 acquired by the moving machine information communication unit 148 are compared with the latest reliability value of the host moving machine 100. If the reliability value of the host moving machine 100 is equal to or lower than the reliability values of the other moving machines 100, the host moving machine 100 autonomously starts the reliability restoring action (S104).

2.2 The reliability restoring moving machine selecting unit 147 selects the moving machine 100 that is to take the reliability restoring action depending on battery remaining power of a battery that feeds power to the moving machine 100. For example, a moving machine 100 having highest remaining battery power may be selected as the moving machine 100 that is to take the reliability restoring action. The selection condition is applicable if at least one of the maximum value, the mean value, and the median of all the reliability values of the moving machines 100 is lower than a second threshold value. Since this method makes battery remaining power values of the moving machines 100 uniform, a long operation time may be ensured.

In accordance with the first embodiment, the moving machine information communication unit 148 communicates information indicating battery remaining power in addition to the self-location and the reliability value o the other moving machines 100 to share these pieces of information. Each moving machine 100 compares the latest battery remaining power thereof with the latest remaining power of the other moving machines 100. If there is no other moving machine 100 having remaining battery power higher than the remaining battery power of the moving machine 100, the moving machine 100 autonomously starts the reliability restoring action (S104).

2.3 The reliability restoring moving machine selecting unit 147 selects a moving machine 100 in accordance with the reliability value. For example, the reliability restoring moving machine selecting unit 147 selects a moving machine 100 having a highest reliability value as the moving machine 100 that is to take the reliability restoring action. The selection condition is applicable if at least one of the maximum value, the mean value, and the median of all the reliability values of the moving machines 100 is lower than the second threshold value.

In accordance with the first embodiment, the moving machine information communication unit 148 compares the latest reliability value of the moving machine 100 with the latest reliability values of the other moving machines 100 acquired by the moving machine information communication unit 148. If there is no other moving machine 100 having the reliability value higher than the reliability value of the moving machine 100, the moving machine 100 autonomously starts the reliability restoring action (S104).

2.4 The reliability restoring moving machine selecting unit 147 selects a moving machine 100 closest to a region having the highest reliability value as the moving machine 100 that is to take the reliability restoring action. The selection condition is applicable if at least one of the maximum value, the mean value, and the median of all the reliability values of the moving machines 100 is lower than the second threshold value. In this case, an amount of energy for the reliability restoring action is minimized, and time for the reliability restoring action is shortened.

In accordance with the first embodiment, each moving machine 100 collects the reliability values of all the moving machines 100 from the memory 140, and searches for a region having the highest reliability value. The moving machine 100 calculates the Euclidean distance between coordinates of the region having the highest reliability value and the self-location of another moving machine 100, and compares the calculated Euclidean distance with the Euclidean distance between the coordinates of the region having the highest reliability value and the self-location. If there is no Euclidean distance that is shorter than the Euclidean distance between the coordinates of the region having the highest reliability value and the self-location, the moving machine 100 autonomously starts the reliability restoring action (S104).

Examples (patterns) of specific control methods of the reliability restoration by the moving machine 100 selected by the reliability restoring moving machine selecting unit 147 are described below.

The reliability restoring action control unit 145 is a processor that controls the mover 101 such that the moving machine 100 selected by the reliability restoring moving machine selecting unit 147 moves to a location having a higher reliability value in response to information recorded on the position reliability recording unit 144.

3.1 The reliability restoring action control unit 145 controls the mover 101 in response to the reliability value stored on the memory 140 such that the moving machine 100 successively moves along the self-locations recorded on the memory 140 until the reliability value is equal to or above a predetermined threshold value (S104).

The control method is described with reference to data of FIG. 3. It is assumed that the present time is 6, the threshold value is 0.8, and the identifier indicating the selected moving machine 100 is 1001. By controlling the mover 101, the reliability restoring action control unit 145 moves the moving machine 100 such that the moving machine 100 is routed along G (reliability value of 0.3)→F (reliability value of 0.5)→E(reliability value of 0.6)→D(reliability value of 0.8). More specifically, the moving machine 100 changes back to the one that has selected the path that reaches coordinates having the reliability value equal to or above the threshold value.

The self-location is then re-estimated at a coordinate location having a higher reliability value. Using the moving machine 100, another moving machine 100 estimates the self-location thereof again, thereby increasing the reliability values of all the moving machines 100.

The reliability restoring action described above is effective when the moving machine 100 moves in a given space for the first time, or when the reliability values sharply drops because of an occurrence of sudden wind.

3.2 The reliability restoring action control unit 145 controls the mover 101 such that the moving machine 100 moves to a location that is closest to the current location and where the reliability value stored on the memory 140 is equal to or above a predetermined threshold value.

Figure 5:
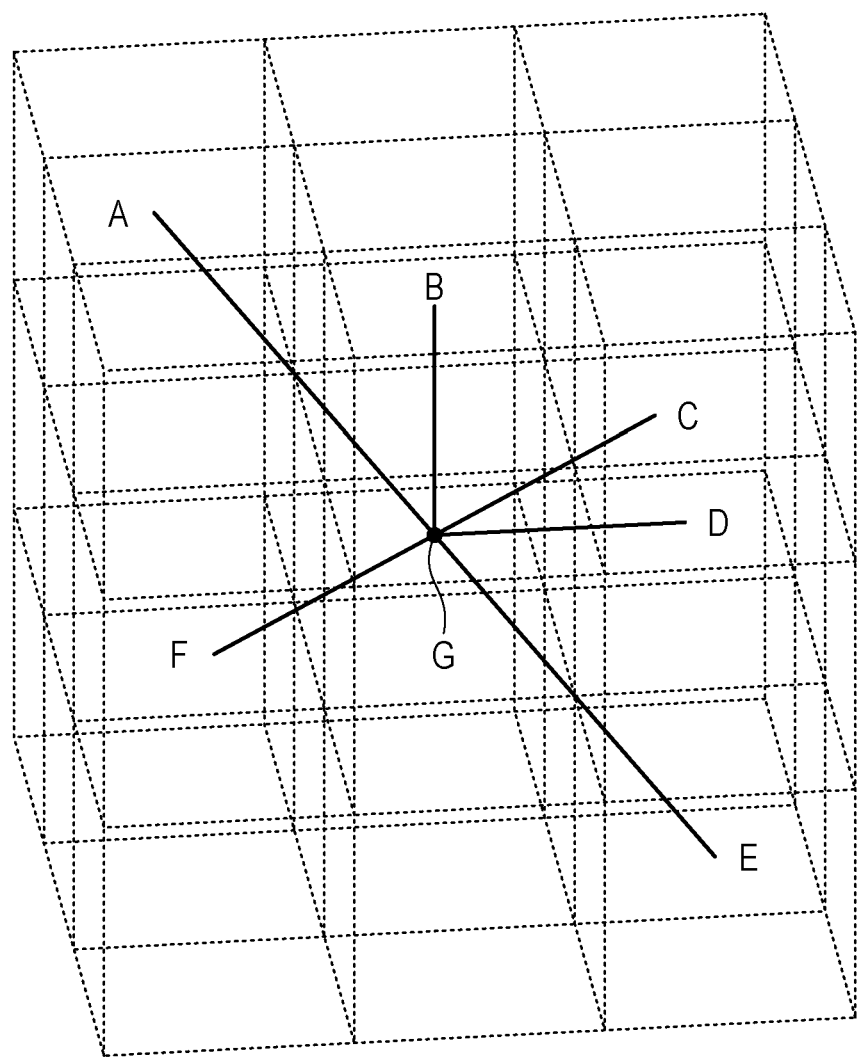
FIG. 5 is a perspective view three-dimensionally illustrating a positional distribution of reliability centered on a self-location.

More specifically, as illustrated in FIG. 5, the memory 140 stores coordinate locations that are present in an ambient area centered on the self-location of the moving machine 100 selected when the reliability value satisfies the predetermined condition (present time 6) (at up and down, back and forth, and left and right positions) and that have the reliability value equal to or above the first threshold value (0.8). Those coordinate locations may be A, C, and D, for example, and extracted from the reliability values of all the moving machines 100 according to the information stored on the memory 140. The Euclidean distance between each coordinate location and the current self-location is calculated. The mover 101 is controlled such that the moving machine 100 linearly moves to a coordinate location having the shortest Euclidean distance (D, for example). The moving machine 100 thus reaches the coordinate location D.

The moving machine 100 reaches the coordinate location having the highest reliability value within a short period of time. The moving machine 100 estimates the self-location at the coordinate location again, and may shift to an action to perform a standard job within a short period of time.

Such a reliability restoring action is effective when the moving machine 100 performs an inspection operation within a narrow area.

3.3 The reliability restoring action control unit 145 controls the mover 101 such that the moving machine 100 moves to a location where a selected moving machine 100 has a past reliability value equal to or above a predetermined threshold value and that is associated with time information having time closest to the present time.

The control method is described with reference to data of FIG. 3. It is assumed that the present time is 6, and the threshold value is 0.8. The reliability restoring action control unit 145 checks the reliability values at id 1001 along time series 6 (reliability value 0.3)→5 (reliability value 0.5)→4 (reliability value 0.6)→3 (reliability value 0.8), and controls the mover 101 such that the moving machine 100 moves to a coordinate location having a reliability value equal to or above the threshold value, namely, the coordinate location (D). The moving machine 100 thus moves to the coordinate location D.

As described above, the moving machine 100 reaches the coordinate location having the highest reliability value within a short period of time. The moving machine 100 estimates the self-location at the coordinate location again, and may shift to an action to perform a standard job within a short period of time.

Such a reliability restoring action is effective when the moving machine 100 moves within a wide space with a small number of obstacles.

Second Embodiment

An autonomous moving machine system 110 of a second embodiment of the disclosure is described below. Elements identical in operation, function, shape, mechanism, and structure to those of the first embodiment are designated with the same reference numerals, and the discussion thereof is omitted. The following discussion focuses on a difference between the first embodiment and the second embodiment, and the same discussion is not repeated.

Figure 6:
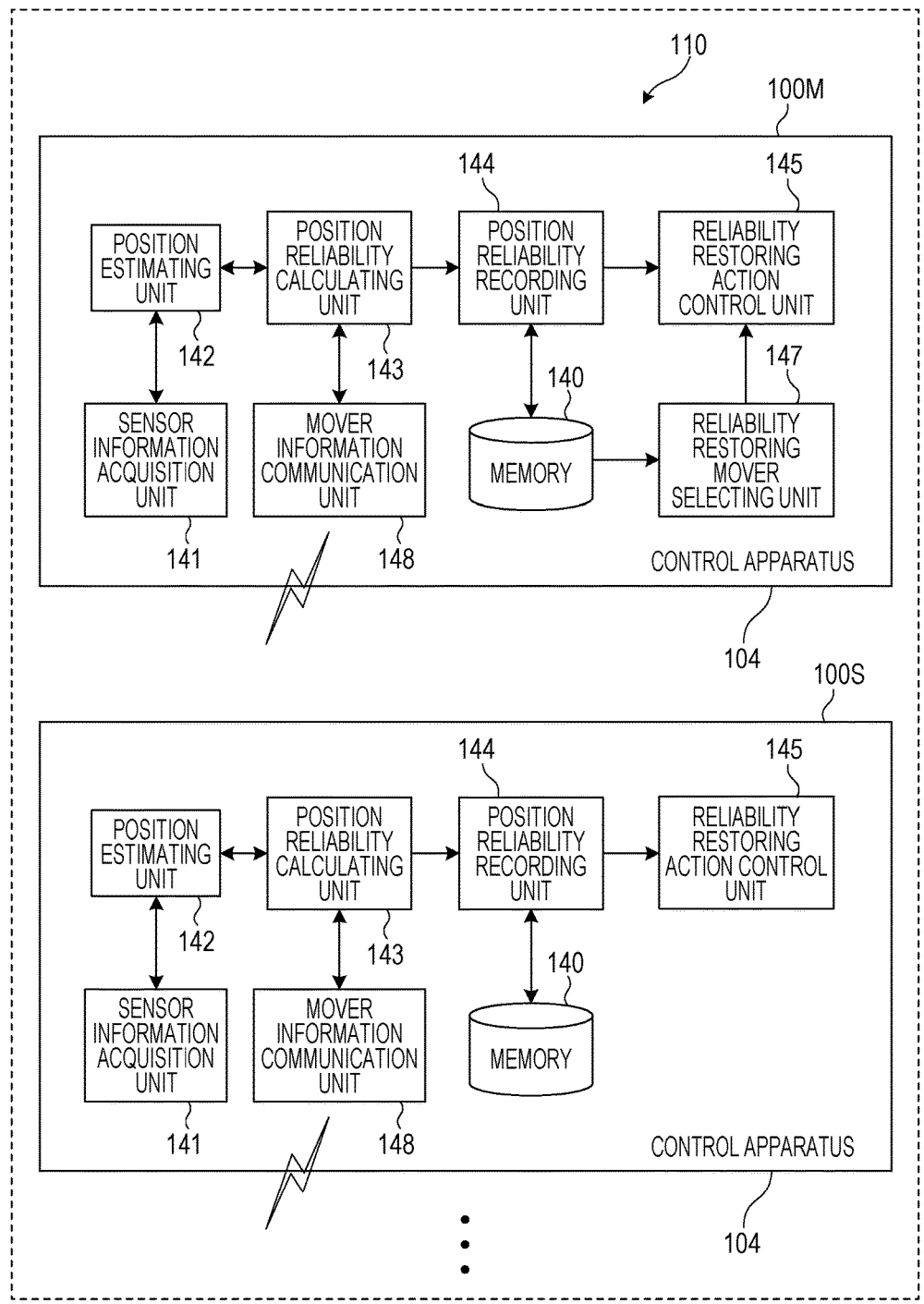
FIG. 6 is a block diagram illustrating functional units of the moving machine in an autonomous moving machine system of a second embodiment.

FIG. 6 is a block diagram illustrating functional units of the moving machine in an autonomous moving machine system of the second embodiment.

The autonomous moving machine system 110 of the second embodiment includes as moving machines 100 a master moving machine 100M including a reliability restoring moving machine selecting unit 147 in control apparatus 104 and a slave moving machine 100S that moves in response to a command from the master moving machine 100M.

The master moving machine 100M collects the self-locations and reliability values of all the moving machines 100 via the moving machine information communication unit 148. In a similar way to the first embodiment or in response to a determination result described below, the reliability restoring moving machine selecting unit 147 in the master moving machine 100M selects a moving machine 100 that is to take the reliability restoring action.

Described below are examples (patterns) of selection conditions according to which the moving machine 100 to perform a reliability restoring action different from the reliability restoring action of the first embodiment is selected.

2.5 The reliability restoring moving machine selecting unit 147 selects at least one moving machine 100 that is to take the reliability restoring action from among the moving machines 100 present in a region where moving machines 100 having a lower reliability value aggregate. The master moving machine 100M transmits through the moving machine information communication unit 148 information indicating that the moving machine 100 has been selected. The selection condition is applicable if the variance of the reliability values of all the moving machines 100 continues to be equal to or above a first threshold value for a first threshold duration of time, or if a difference between a minimum value and a maximum value of the reliability values of all the moving machines 100 continues to be equal to or above the first threshold value for the first threshold duration of time.

In accordance with the second embodiment, coordinates associated with a reliability value equal to or below a predetermined threshold value are extracted from the latest reliability values and the coordinates of the self-locations of all the moving machines 100 collected by the moving machine information communication unit 148. A specific unit region having the largest number of coordinates is identified as a region where moving machines 100 having lower reliability values aggregate. One moving machine 100 is selected from the moving machines 100 at the coordinates within the identified region. The moving machine information communication unit 148 transmits information indicating that the moving machine 100 has been selected. If the master moving machine 100M is selected, transmitting the information concerning the master moving machine 100M is not needed.

2.6 The reliability restoring moving machine selecting unit 147 selects a moving machine 100, in a region where moving machines 100 aggregate, as the moving machine 100 that is to take the reliability restoring action. Using the moving machine information communication unit 148, the master moving machine 100M transmits to the moving machine 100 information that the moving machine 100 has been selected. The selection condition of the moving machine 100 is applicable if at least one of the maximum value, the mean value, and the median of the reliability values of all the moving machines 100 is below a second threshold value.

In accordance with the second embodiment, a specific unit region having the largest number of coordinates therewithin is identified as a region where moving machines 100 having lower reliability values aggregate by referencing the coordinates of the latest self-locations of all the moving machines 100 collected by the moving machine information communication unit 148. One moving machine 100 is selected from the moving machines 100 at the coordinates within the identified region. The moving machine information communication unit 148 transmits information indicating that the selected moving machine 100 has been selected.

The process workload on the control apparatus 104 of the slave moving machine 100S is thus reduced by causing the master moving machine 100M in a centralized fashion to evaluate the reliability values of all the moving machines 100 and to select the moving machine 100 that is to take the reliability restoring action.

EXAMPLES

Specific examples of the autonomous moving machine system 110 are described below.

Figure 7:
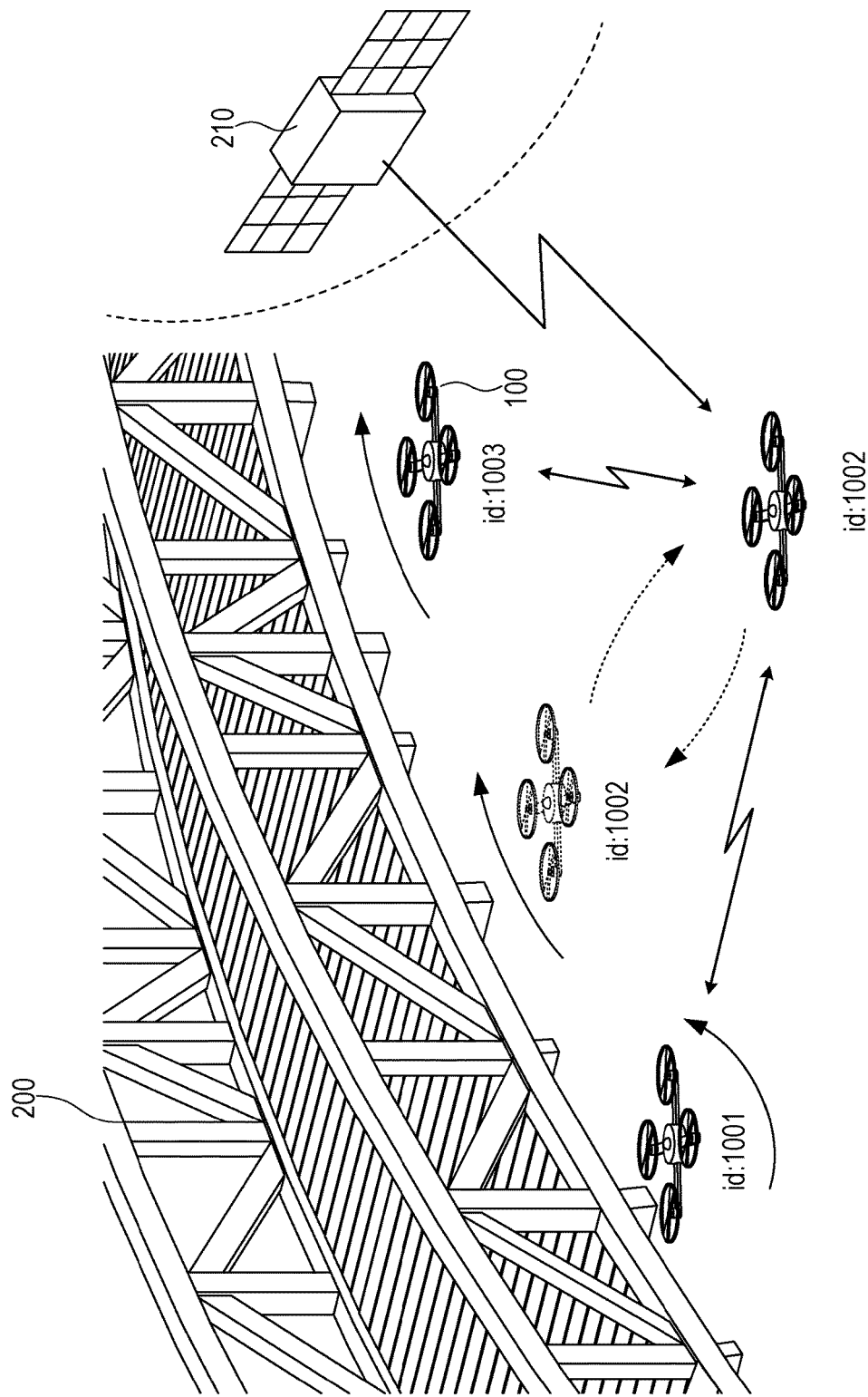
FIG. 7 is a perspective view of the autonomous moving machine system that performs bridge inspection.

FIG. 7 is a perspective view of the autonomous moving machine system 110 that performs a bridge inspection job.

Referring to FIG. 7, in this example, the moving machine 100 is a drone, and the autonomous moving machine system 110 includes multiple drone-type moving machines 100. The job performed of the autonomous moving machine system 110 is an inspection job to be performed on the underside of a bridge 200. Each moving machine 100 having an inspection camera mounted on top thereof photographs the underside of the bridge 200. The moving machines 100 perform this job on their respective portions of the underside of the bridge. Cracks on the structure of the bridge 200 may be detected by referencing a video captured by each moving machine 100 and the location of the captured video.

Each moving machine 100 estimates the self-location and performs the job using the Kalman filter in accordance with the sensor information from the sensor 103, such as IMU or GPS, and the relative positional relationship of the moving machine 100. As the job is in progress, the reliability of the whole autonomous moving machine system 110 decreases. For example, the variance of the reliability values of the self-locations of all the moving machines 100 may continue to be equal to or above a first threshold value for a first threshold duration of time or longer. In such a case, each moving machine 100 communicates with the other moving machines 100 via the moving machine information communication unit 148 and selects a moving machine 100 that is closest to a region having a higher reliability value (in this example, the moving machine 100 having id 1002).

In response to the information stored on the memory 140, the reliability restoring action control unit 145 in the selected moving machine 100 controls the mover 101 such that the moving machine 100 moves to the region having the higher reliability value, for example, the region where signals from GPS satellites 210 are received.

The moving machine 100 that moves by controlling the mover 101 restores the reliability value of the self-location and returns back to the location where the moving machine 100 starts the reliability restoring action, and then photographs the bridge 200.

The moving machine 100 increases the reliability value of the other moving machines 100 by transmitting the new self-location and reliability value to the other moving machines 100. The overall reliability of the autonomous moving machine system 110 is thus increased.

As described above, the autonomous moving machine system 110 may perform the job efficiently while keeping the system reliability at a higher level.

The disclosure is not limited to the embodiments. For example, an embodiment of the disclosure may be configured by using some of the elements described in this specification in any combination, or by deleting some of the elements. The embodiments may be modified in a manner recognized by ordinarily skilled artisans within the scope of the disclosure, namely without departing from the scope of the disclosure defined by the claims. The modifications fall within the scope of the disclosure.

In the above discussion, the master moving machine 100M performs the standard job as the slave moving machine 100S does. Alternatively, the master moving machine 100M may only manage the slave moving machine 100S without performing the standard job.

Figure 8:
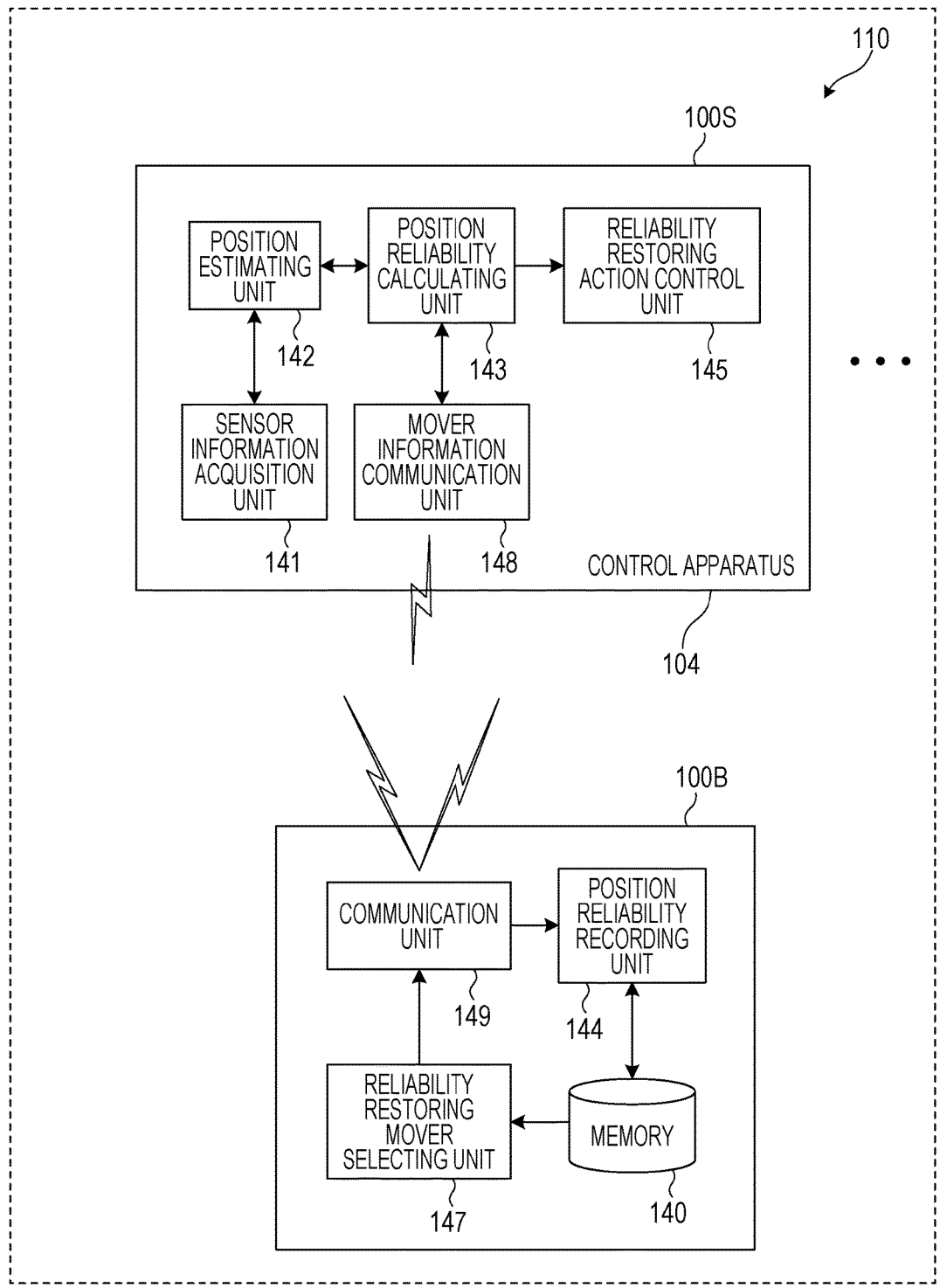
FIG. 8 is a block diagram illustrating functional units of the moving machine in an autonomous moving machine system of another embodiment.

As illustrated in FIG. 8, the autonomous moving machine system 110 may include a fixed apparatus 1006 that includes the position reliability recording unit 144, the reliability restoring moving machine selecting unit 147, and a communication unit 149 that is communicable with the moving machine information communication unit 148. In this case, the moving machines 100 are all slave moving machines 100S. The fixed apparatus 1006 acquires the self-locations and the reliability values from the slave moving machines 100S via communication, selects in accordance with these pieces of information a slave moving machine 100S whose reliability is to be restored, and transmits to the selected slave moving machine 100S information indicating that the slave moving machine 100S has been selected. In this case, as well, the slave moving machine 100S may not necessarily have to include the position reliability recording unit 144 and the memory 140.

The fixed apparatus 100B may collect the sensor information via the sensor information acquisition unit 141 and the moving machine information communication unit 148 in each slave moving machine 100S, and may calculate the self-locations and the reliability values of all the moving machines 100S. The reliability restoring moving machine selecting unit 147 in the fixed apparatus 100B may select in accordance with the reliability values a slave moving machine 100S that is to take the reliability restoring action.

In accordance with the embodiments, the moving machine 100 is an autonomous flying object that freely and three-dimensionally moves, namely, is a drone flying in the air. The moving machine 100 is not limited to the drone. The moving machine 100 may be an autonomous vehicle running on the ground, or an autonomous ship cruising on the sea.

The sensor 103 that acquires information contributing to estimating the self-location is not limited to any particular type. The sensor 103 may further include any sensor that has not been described herein.

All processes are implemented by the control apparatus 104 alone. Alternatively, the processes may be distributed among multiple controllers, and information may be exchanged among the controllers via mutual communication.

The self-location and the reliability value are successively calculated during the reliability restoring action, and the reliability restoring action may be ended when the acquired reliability value exceeds a predetermined value. Alternatively, the reliability restoring action may be ended when the self-location matches the target location.

After the reliability is restored, the moving machine 100 may return back to the location where the reliability restoring action starts. Alternatively, the moving machine 100 may directly move to a target location from the location where the reliability is restored.

The disclosure finds applications in vehicles, trains, ships, air planes, and vacuum cleaners, each of these moving in an autonomous fashion.

What is claimed is:

1. A system comprising:
    moving machines, each moving machine of the moving machines configured to move to a target location by autonomous control, each moving machine comprising:
    a sensor which obtains a self-location of the moving machine;
    a processor; and
    a memory storing a computer program which, when executed by the processor, causes the processor to perform operations, the operations including:
    acquiring, from the sensor, sensor information related to the self-location of the moving machine, the sensor information including a relative positional relationship between the moving machine and another moving machine of the moving machines;
    estimating the self-location of the moving machine based on the acquired sensor information;
    calculating a reliability of the estimated self-location of the moving machine, and storing the reliability associated with the self-location on the moving machine;
    transmitting the stored reliability associated with the self-location of the moving machine, to the other moving machine,
    wherein the operations performed by a particular moving machine of the moving machines further include,
    recording history information that associates the reliability, the self-location, and an identifier identifying each of the moving machines;
    selecting, from the moving machines, a moving machine to restore the reliability in accordance with the history information; and
    moving the selected moving machine to a location where the reliability of the self-location of the selected moving machine increases.

2. The system according to claim 1,
wherein the reliability decreases in response to an elapsed time from or in response to a travel amount of the moving machine from when the sensor acquires an absolute position of the moving machine, and the reliability increases when the sensor acquires the absolute position of the moving machine, and
wherein the absolute position is measured by using a GPS or a land mark at a known position.

3. The system according to claim 2,
wherein the moving machine to restore the reliability is selected in accordance with a statistical quantity that is calculated from all reliabilities related to the moving machines.

4. The system according to claim 3,
wherein the statistical quantity includes a variance or a difference between a maximum value and a minimum value of the all reliabilities, and
wherein the moving machine to restore the reliability is selected when the variance or the difference between the maximum value and the minimum value of the all reliabilities remains at or above a first threshold value for longer than a first time threshold.

5. The system according to claim 3,
wherein the statistical quantity includes a maximum value, a mean value, and a median of the all reliabilities, and
wherein the moving machine to restore the reliability is selected when at least one of the maximum value, the mean value, and the median of the all reliabilities sharply falls.

6. The system according to claim 3,
wherein the statistical quantity includes a maximum value, a mean value, and a median of the all reliabilities, and
wherein the moving machine to restore the reliability is selected when at least one of the maximum value, the mean value, and the median of the all reliabilities is lower than a second corresponding threshold value.

7. The system according to claim 2, wherein each of the moving machines is a drone.

8. The system according to claim 7, wherein the sensor information is a number of rotation of a rotor of the drone.

9. The system according to claim 1,
wherein the moving machine to restore the reliability is selected in accordance with the reliability.

10. The system according to claim 9,
wherein the moving machine, having a minimum reliability of all reliabilities related to the moving machines, is selected as the moving machine to restore the reliability.

11. The system according to claim 9,
wherein the moving machine, having a maximum reliability of all reliabilities related to the moving machines, is selected as the moving machine to restore the reliability.

12. The system according to claim 1,
wherein the moving machine having maximum remaining battery power is selected as the moving machine to restore the reliability.
13. The system according to claim 1,
wherein the moving machine, positioned closest to a region having a reliability higher than a predetermined value, is selected as the moving machine to restore the reliability.
14. The system according to claim 1,
wherein the moving machine, present in a region where multiple moving machines each having a reliability lower than a predetermined value are present, is selected as the moving machine to restore the reliability.
15. The system according to claim 1,
wherein a moving machine, present in a region where multiple moving machines are present, is selected as the moving machine to restore the reliability.
16. The system according to claim 1,
wherein the self-location is estimated using normal distribution, and
wherein the reliability of the select-location is calculated by calculating a reciprocal of a variance of the normal distribution.

* * * * *